United States Patent
Bede et al.

(10) Patent No.: US 12,126,216 B2
(45) Date of Patent: Oct. 22, 2024

(54) ENERGY STORAGE CONNECTED TO A PLURALITY OF POWER BUSSES

(71) Applicant: KK WIND SOLUTIONS A/S, Ikast (DK)

(72) Inventors: Lóránd Bede, Herning (DK); Anders Eggert Maarbjerg, Ulstrup (DK); Paw Rosenvard, Gjern (DK)

(73) Assignee: KK WIND SOLUTIONS A/S, Ikast (DK)

( * ) Notice: Subject to any disclaimer, the term of this patent is extended or adjusted under 35 U.S.C. 154(b) by 65 days.

(21) Appl. No.: 17/626,618

(22) PCT Filed: Jul. 15, 2020

(86) PCT No.: PCT/DK2020/050216
§ 371 (c)(1),
(2) Date: Jan. 12, 2022

(87) PCT Pub. No.: WO2021/008667
PCT Pub. Date: Jan. 21, 2021

(65) Prior Publication Data
US 2022/0320894 A1    Oct. 6, 2022

(30) Foreign Application Priority Data
Jul. 16, 2019   (DK) .......................... PA 2019 70466

(51) Int. Cl.
*H02J 9/06* (2006.01)
*H02J 3/32* (2006.01)

(52) U.S. Cl.
CPC .............. *H02J 9/068* (2020.01); *H02J 3/32* (2013.01); *H02J 9/062* (2013.01); *H02J 2300/28* (2020.01)

(58) Field of Classification Search
CPC .... H02J 9/068; H02J 3/32; H02J 9/062; H02J 2300/28
See application file for complete search history.

(56) References Cited

U.S. PATENT DOCUMENTS 8,970,161 B1   3/2015   Cuadros
2009/0171521 A1   7/2009   Moki et al.
(Continued)

OTHER PUBLICATIONS

International Search Report dated Sep. 17, 2020 issued in Patent Application No. PCT/DK2020/050216.
(Continued)

*Primary Examiner* — Daniel Cavallari
(74) *Attorney, Agent, or Firm* — Pearne & Gordon LLP (57) ABSTRACT

The application relates to an energy storage including a plurality of energy modules arranged in one or more energy module strings. A string controller is configured for controlling a current path through the energy module strings by controlling the status of a plurality of semiconductor switches. A first end of a current path is electrically connectable to a first electric system of a first electric bus via a first bus switch and to a second electric system of a second electric bus via a second bus switch. A second end of the current path is electrically connectable to a first reference potential being the same as the reference potential of the electric systems connected to the first end of the current path. An energy storage controller is configured for controlling the status of the first bus switch and of the second bus switch in dependency of the received power status.

18 Claims, 3 Drawing Sheets

(56) References Cited

U.S. PATENT DOCUMENTS

| | | |
|---|---|---|
| 2014/0274219 A1 | 9/2014 | Reeder et al. |
| 2015/0380959 A1 | 12/2015 | Chang et al. |
| 2016/0105042 A1 | 4/2016 | Taylor et al. |
| 2017/0141596 A1 | 5/2017 | Hansen |
| 2019/0103750 A1* | 4/2019 | Kristensen .......... H01M 10/441 |

OTHER PUBLICATIONS

Written Opinion dated Sep. 17, 2020 issued in Patent Application No. PCT/DK2020/050216.
Danish Search Report dated Jan. 31, 2020 issued in in Patent Application No. PA 2019-70466.
Danish Additional Search Report dated Aug. 27, 2020 issued in Patent Application No. PA 2019-70466.

* cited by examiner

ENERGY STORAGE CONNECTED TO A PLURALITY OF POWER BUSSES

FIELD OF THE INVENTION

The invention relates to an energy storage comprising a plurality of individually controllable switches controlling a current path from one or more power busses to and through the energy storage.

BACKGROUND OF THE INVENTION

Utility grid operators and owners of e.g. wind turbines and photovoltaic systems are using energy storage systems to build up energy buffers in times where prices are low or production is higher than consumption. Then when prices or consumption is high, energy from the buffer can be utilised.

Energy storages are also known to be used as energy source in uninterruptible power supplies that ensures power availability for critical components of electric systems such as pitch drive of a wind turbine. Typically in a wind turbine, the energy storage is charged from the generator or from the grid. In case the generator for some reason does not produce energy sufficient to supply to the grid or the grid connection is lost, the charging of the energy storage terminates and so does the supply to the e.g. auxiliary system of the wind turbine when the energy storage is empty. Sometimes in this situation, combustible electric generators are used to ensure power to the auxiliary system.

One example of an energy storage system is found in US2019/0103750 disclosing groups of energy modules controlled by group controllers. Two or more groups of energy modules is connected into a string controlled by a string controller. Several string controllers are controlled by a parallel string controller. Several parallel string controllers are controlled by a "coordinator" and several coordinators are controlled by a master controller which are communicating with external (see para 146, 147 and 184 of US2019/0103750).

Obviously, it is a problem for the wind turbine owners if their wind turbine after a period of stand still does not have power to start-up and the solution of using e.g. a diesel generator is expensive and require fuel delivered to the wind turbine and known energy storage systems as the one disclosed in US2019/0103750 requires a complicated hierarchical control system.

SUMMARY OF THE INVENTION

It is an object of the present invention, to solve the above mentioned problems and thereby provide a system that can ensure power to e.g. an auxiliary system of a wind turbine during long periods of grid disconnection and/or wind speeds below the cut-in threshold.

Further, it is an object of the present invention, to provide an energy storage system that can be charged from a source of a first electric system and discharged by a load of a second electric system wherein the two electric systems are galvanic isolated i.e. do not refer to the same electric reference potential. Further, it is an object to provide an energy storage system that can be charged/discharged by two electrical systems which are not galvanic isolated, but have different electrical characteristics (voltage, frequency, etc.).

The present invention relates to an energy storage comprising a plurality of energy modules electrically connected to a switching module, at least part of the plurality of the energy modules comprises a plurality of battery elements and are electrically connected via the switching module and thereby configured to establish an energy module string. Wherein the switching arrangement comprise four switches in a H-bridge configuration and thereby configured to control if a current path though the energy module string is bypassing or passing through the energy module associated with the switching arrangement. Wherein a string controller is configured for controlling the status of the four switches and thereby the current path through the energy module string. Wherein a first end of the current path is electrically connectable to a first electric system of a first electric bus via a first bus switch and to a second electric system of a second electric bus via a second bus switch. Wherein a second end of the current path is electrically connectable to a first reference potential, the first reference potential being the same as the reference potential of the electric system connected to the first end of the current path. Wherein an energy storage controller is configured for receiving power status from the first electric system and from the second electric system, and wherein the energy storage controller is configured for controlling the status of the first bus switch and of the second bus switch and to provide a control signal to the string controller in dependency of the received power status. Wherein the string controller is configured to control the number of energy modules to include in the current path based on the received control signal and to control which of the energy modules to include in the current path based on the information received from the individual energy modules.

An energy storage connectable to at least two electric busses are advantageous in that it has the effect, that the same energy storage can be connected to both (or a plurality) of the electric busses and thereby transfer power from one to the other independent of characteristics of the electric network of the power busses such as frequency, rated voltage/current (of e.g. electric system(s) of the busses), Direct or Alternating Current, etc. This is because the mode of operation of the energy storage can be changed in dependency of power status of the electric busses (or electric systems hereof) and/or in combination with state of charge and/or state of health of individual energy modules of the energy storage and/or environmental conditions of the energy storage system such as ambient temperature or relative humidity.

The current path is understood as an electric path through one or more of the energy modules of the energy storage. This path is defined by the switches assigned to the individual energy modules i.e. determining, for each individual energy module, if the current path is bypassing or going through the battery elements of the energy module. Assigned should here by understood as dedicated to the control of a particular energy module. The status of the switches can either be open (i.e. preventing current from flowing) or closed (i.e. enabling current flow). It should be mentioned that a situation could occur where the current path does not include any energy modules of an energy module string i.e. where all of the energy modules are by-passed. This could e.g. be the case during AC operation where we have a zero crossing of the voltage.

The first end of the current path is connectable to either a first or a second electric bus via bus switches (such as semiconductor switches or contactors). Hence, via the electric buses, the energy storage is connectable to an electric system of the electric buses. An electric bus should be understood as a power line of a specific voltage and frequency (DC is 0 Hz), to which one or more electric systems such as power sources and/or consumers can be connected.

Examples of electric systems (first and second) are power sources/power generating systems such as wind turbines, diesel generators and photovoltaic system, power consuming systems such as auxiliary systems of wind turbines and electric systems of ships, motor drive, pumps and power distribution systems such as the utility grid. It should be mentioned, that the utility grid can be seen both as a source and a consumer.

The second end of the current path is connectable to a reference potential which is typically a neutral point which may or may not be connected to ground potential. However, in isolated electric systems, the reference potential may be different from the ground potential and even be a floating potential i.e. a varying potential. What is important with respect to the present invention, is that the first reference potential, to which the second end of the current path is connected to, is the same as the reference potential of the electric system, to which the first end of the current path is connected to.

The power status received from the first and second electric systems include information of e.g. availability of power from a power source such as a wind turbine. This information could be obtained from a wind turbine controller or from measurements of the electric bus to which the wind turbine is connected.

The power status could also include a requirement from an electric system such as the auxiliary system of always being powered. Hence, power status may include information of a situation where the main power supply to an auxiliary system fails and thus requires supply from the energy storage. Another example could be where the auxiliary system requires more power than the main power supply can provide, e.g. a temporary "overload" or inrush current. Such information can be obtained from measurements made to on the electric bus to which the auxiliary system is connected or from a controller of the auxiliary system.

The power status could also include information obtained from a utility grid related to grid faults or instability of the grid. This information may be obtained from measurements made on the utility grid.

Accordingly, power status may be measurements made at or in relation to or be information from the electric systems or the energy storage. Information related to the energy storage may include state of charge of the storage elements of the energy module. Such measurements may be compared to defined threshold values and based on the comparison, the energy storage controller initiate charge or discharge of the energy storage by control of the bus switches.

According to an embodiment of the invention, the second end of the current path is connectable to the first reference potential via a first reference potential switch and to a second reference potential via a second reference potential switch.

This is advantageous in that it has the effect, that the string controller or preferably the energy storage controller is able to change refenced potential preferably for each of the energy module strings of the energy storage. Thereby, enabling simultaneously connection of one energy module string to an electric system having a first reference potential and of a second energy module string to an electric system having a second reference potential having a second reference potential.

According to an embodiment of the invention, the energy module string voltage is the sum of voltages of the plurality of energy modules connected to the current path, and wherein the sum of voltages is established by a plurality of full energy module voltages and at least one partly full energy module voltage and wherein sting controller is configured to determine which of the energy modules to include to establish the energy module string voltage.

This is advantageous in that it has the effect, that any string voltage in the range of full energy module voltage of all energy modules of the energy module string and one energy module can be established. Accordingly, the energy module voltage is not limited to only increase in steps of the individual energy module voltage. Note that the voltage of energy modules in the energy module string does not need to be the same for each energy module.

According to an embodiment of the invention, the energy module string voltage is established by at least one full energy module voltage and a plurality of partly full energy module voltages, wherein sting controller is configured to determine which of the energy modules to include to establish the energy module string voltage.

This is advantageous in that it has the effect, that even energy modules not able to deliver full energy module voltage e.g. due to wear can be used in establish the string voltage.

According to an embodiment of the invention, the string controller is configured for controlling the partly full energy module voltage according to pulse width modulation control of the connection of at least one energy module to the current path.

This is advantageous in that it has the effect, only based on a voltage reference received from the energy storage controller, the string controller is able to perform individual pulse wide modulation of energy modules of the string. Accordingly based on historic usage of the individual energy modules, the string controller is able to determine which module that should deliver which part of the string voltage. This is advantageous sin that it has the effect, that the string controller can control rotation of individual energy modules e.g. based on estimated remaining lifetime, cycle counts, etc. Thereby to one extreme drive one energy module at the time to break down and to the other extreme ensure even distribution of wear of the modules.

According to an embodiment of the invention, the string controller is configured to calculate the on-time of the individual energy modules shaping the string voltage to avoid battery on-time less than 10 ms. It is preferred, that switching does not occur with the same frequency as the sample.

This is advantageous in that it has the effect that switch losses are reduced and wear of the individual energy module is reduce.

According to an embodiment of the invention, the energy storage includes at least two energy module strings.

This is advantageous in that it has the effect, that the one string can be charged from one of the busses and the other string discharged to the other bus. In fact, this charging/discharging can be done simultaneously.

Accordingly it is possible turn ON both bus switches at the same time so that current can flow into one string from one bus and out from the other string to the second bus. In practice it means that it is possible basically to connected the two busses together so power can flow directly from one bus to the other, and we have the possibility to either take power into the string or give power out of the string. This at least true when the two busses have the same voltage, frequency and reference point.

According to an embodiment of the invention, each of the at least two energy modules strings are connectable to the first electric bus via the first bus switches and to the second electric bus via the second bus switches, and wherein each of the at least two energy module strings are connectable to the first reference potential via the first reference potential switch and to the second reference potential via the second reference potential switches.

This is advantageous in that it has the effect, that the control of charging and discharging of the energy storage can be made very flexible in that all energy module strings can be charged from/discharged by electric systems of all electric busses independent of grounding/reference systems hereof. More specifically, it is possible to connect one string of the energy storage to a first electric system having a first reference potential and to a second electric system having a second reference potential.

A further advantage is that by having two strings, it is possible to provide continuous power transfer from one bus to another bus.

Further having e.g. three energy modules strings is advantageous in that it has the effect, that each phase of a three-phased power bus can be connected to an energy module string. Further, the first and second bus switches allows to switch the strings from one phase to the other or even to a fourth bus, e.g. DC or single phase system.

According to an embodiment of the invention, a first energy module string is connected to the first electric bus simultaneously with the second energy module string is connected to the second electric bus.

This is advantageous in that it has the effect, that the energy storage or more precisely an energy module string hereof can be charged at the same time as another energy module string can act as power supply.

According to an embodiment of the invention, the energy modules comprise between 1 and 20 battery elements, preferably between 5 and 18 battery elements, most preferably 7 or 17 battery elements.

According to an embodiment of the invention, wherein the energy modules comprises between 2 and 25 energy modules, preferably between 2 and 20 energy modules and most preferably between 2 and 15 energy modules.

This is advantageous in that it has the effect, that the one energy module string can be comprised by one electric cabinet. Hence, supplying of up to 1000V to a load in case the energy modules are each 50V modules can be done from one electric cabinet. The electric cabinet may facilitate installation of the energy modules by means of a drawer like system enabling plug and play and easy replacement of one single energy module. Such drawer like system includes a socket like electric connectors at the energy module pack and an associated plug like electric connection in the electric cabinet.

The number of battery elements is determined based on required capacity of the battery storage, operation parameters of the system, etc. Preferably, the battery elements of the battery cell are connected in series According to an embodiment of the invention, one or more of the energy modules comprises one or more capacitors, one or more photovoltaic elements and/or one or more fuel cells.

The capacitors are advantageous in that it has the effect that the energy storage may react faster i.e. deliver a higher power for a shorter time compared to modules only comprising battery elements.

According to an embodiment of the invention, one or more of the energy modules comprise solely of capacitor modules.

This is advantageous in that it has the effect, that such energy module is able to provide high current faster than modules only comprising battery elements to an electric (load) system. The downside is that less energy is available, again compared to modules only comprising battery elements.

It should be mentioned that one energy module may comprise solely of capacitors (one or more capacitors) and that each of the energy modules of an energy module string may comprise a mix of battery elements and capacitors or solely of capacitors.

According to an embodiment of the invention, the energy module is connected to the H-bridge midpoint.

The four switches are preferably configured in a H-bridge with the energy module connected between the drain terminals of the two upper switches and the source terminals of the two lower switches (in the embodiment, the switches are MOSFET switches). This configuration is advantageous in that the polarity of the current in the point of connection (H-bridge midpoint) of the energy module to the electric flow path can be changed. Accordingly, a H-bridge configuration is needed when the energy storage is connected to the an AC bus. This configuration of the switches is advantageous in that it has the effect, that current can be controlled in both directions. Two switches can be used if only DC current needs to be controlled, however if AC current is to be controlled, four switches are needed.

According to an embodiment of the invention, the switches associated with a particular energy module are mounted on a printed circuit board associated with the particular energy storage module, wherein the printed circuit board is part of a control signal path between the string controller and the switches, and wherein the printed circuit board is part of the current path through the energy module.

Mounting the switches such as a semiconductor switch on a PCB (PCB; Printed Circuit Board) is advantageous in that complexity in mass production is reduced and easy scaling of the size of the energy storage is facilitated.

The downside of building an energy storage of a plurality of energy modules controlled by PCB mounted switches is that the size of the switches (in terms of possible load current through the single switch) is reduced. This will lead to an increased number of paralleled battery modules (energy modules) due to the current limitation of the energy module string. On the other hand, the smaller size switches are cheaper, this together with the reduced costs of mass production of energy storage and the added flexibility in battery storage design compensate for the increased number of energy modules.

According to an embodiment of the invention, the at least two energy module strings are connectable via a string switch.

This is advantageous in that it has the effect, that the capacity of the energy storage is increased in that it is possible by means of string switches to connect the two energy module strings in parallel and in series. This is at least true for the voltage since there might be a maximum current which can flow through the energy modules.

Further, also high voltages can be achieved, meaning that the difference between two buses can be a couple of factors higher.

According to an embodiment of the invention, the first energy module string is connected to the first electric bus, and simultaneously the first energy module string is connected to the first reference potential, and wherein the second energy module string is connected to the second electric bus, and simultaneously the second energy module string is connected to the second reference potential.

This is advantageous in that it has the effect, that hereby is allowed a continuous power transfer from one bus to the other.

Further, it is advantageous in that it has the effect, that two electric systems having different reference potentials can be connected to the energy storage simultaneously. In this example the electric system of the first bus is charging the strings and the electric system of the second bus is discharging the strings.

Further, it is possible to supply power to two different buses using both strings. In that case, a third bus may be needed which can charge the strings, or one of the buses only sometimes acts as a power source.

Further, it is possible to sink power from two different buses using both the strings. An example could be that one string is being charged from a wind turbine generator and the other is normally supplying power to the grid, but in one instance it may absorb power from the grid due to frequency regulation or the like.

According to an embodiment of the invention, the first energy module string is connected to the first electric bus, and simultaneously the first energy module string is connected to the first reference potential, and wherein the second energy module string is connected to the first electric bus, and simultaneously the second energy module string is connected to the first reference potential.

This is advantageous in that it has the effect, that both the first and second energy module string are connected to the same electric bus and thereby the same electric system which in case this is e.g. a wind turbine generator can both be charged. In the example of a wind turbine, this configuration of charging all energy module strings is only preferred when the load e.g. aux system of the second electric bus is supplied either from the same wind turbine generator or from an alternative power source. In this example the electric system of the first bus is charging the strings and the electric system of the second bus is discharging the strings.

According to an embodiment of the invention, the first energy module string is connected to the second electric bus, and simultaneously the first energy module string is connected to the second reference potential, and wherein the second energy module string is connected to the second electric bus, and simultaneously the second energy module string is connected to the second reference potential.

This is advantageous in that it has the effect, that both the first and second energy module string are connected to the same electric bus and thereby the same electric system which in case this is e.g. an auxiliary system of a wind turbine can both supply such auxiliary system. In the example of a wind turbine, this configuration of supplying an auxiliary system from all energy module strings is only preferred if needed and the energy module strings are sufficiently charged to meet expected future supply requirements (before next expected charging period). In this example the electric system of the first bus is charging the strings and the electric system of the second bus is discharging the strings.

According to an embodiment of the invention, the status of the first bus switches and of the second bus switches is at least partly controlled based on information of the state of charge of the energy modules, wherein the information of state of charge of the energy modules is provided to the energy storage controller from one or more string controllers.

This is advantageous in that it has the effect, that communication between string controllers (controlling current path) and energy storage controller (controlling bus and reference potential switches) ensures optimum charging and discharging of energy modules i.e. which energy modules are most requiring a recharge, and which is ready to be discharge. Together with information of whenever power is needed or available on the electric busses, this ensure optimum exploitation of the capacity of the energy storage and thereby ensures power available for as long time as possible.

According to an embodiment of the invention, the current in the current path is controlled by the string controller to be less than 5 A, preferably less than 3 A, most preferably 0 A before the energy storage controller changes status of the bus switches.

This is advantageous in that it has the effect, that there will be no switching loss and there will be no transient overvoltage due to breaking of the current path. This will cause less stress on the switching device (semiconductor or contactor) and thereby extent the lifetime of the switching device.

According to an embodiment of the invention, the voltage across the switch is controlled towards zero before turning ON the switch.

This is advantageous in that in this way the voltage on the string is synchronized with the voltage on the bus, before turning ON the switch. In an embodiment, this can be achieved by disable all the H-bridges (i.e. the current flow through the energy module string), turning ON the bus switch, synchronizing the controller output with the bus voltage and finally re-enable the H-bridges which than again allows the current to flow.

According to an embodiment of the invention, the first and second electric systems are selected from the list comprising: electric generator, photovoltaic panel, auxiliary systems of a wind turbine, utility grid.

Moreover, the invention relates to a method of controlling the flow of current to and from a plurality of energy modules of an energy module string of an energy storage, the method comprising the steps of: by an energy storage controller receiving power status from a first electric system and from a second electric system, providing a control signal to the string controller in dependency of the received power status, based on the received power status selectively controlling the status of a first bus switch and of a second bus switch and thereby the connection of a first end of the current path to a first electric bus or to a second electric bus, and based on the received power status selectively controlling the status of a first reference potential switch and of a second reference potential switch and thereby the connection of a second end of the current path to a first reference potential or to a second reference potential.

And by a string controller controlling a current path through the energy module string, by controlling the status of a plurality of switching arrangements according to the received control signal, wherein the switching arrangements each comprises four switches in a H-bridge configuration and wherein each individual of the energy modules is assigned to one of the switching arrangements and wherein the switching arrangements thereby is controlling if the current path is bypassing the individual energy module or passing through the individual energy module.

This is advantageous in that it has the effect, that one string (current path therethrough) can be connected to an electric system of the first bus having the first reference potential and at the same time, another string (current path therethrough) can be connected to an electric system of the second bus having the second reference potential.

The control of the bus and reference switches is preferably made in dependency of the received power status of electric systems of the busses and/or power status of the electric busses and/or in combination with state of charge and/or state of health of individual energy modules of the energy storage and/or environmental conditions of the energy storage system such as ambient temperature or relative humidity.

According to an embodiment, the energy module string voltage is the sum of voltages of the plurality of energy modules connected to the current path, and wherein the sum of voltages is established by a plurality of full energy module voltages and at least one partly full energy module voltage wherein the connection of energy modules to establish the energy module string voltage is controlled by the string controller.

According to an embodiment, the energy module string voltage is established by at least one full energy module voltage and a plurality of partly full energy module voltages, wherein the connection of energy modules to establish the energy module string voltage is controlled by the string controller.

According to an embodiment, the string controller is controlling the partly full energy module voltage according to pulse width modulation control of the connection of at least one energy module to the current path.

According to an embodiment, the string controller calculates the on-time of the individual energy modules shaping the string voltage to avoid energy module on-time less than 10 ms.

According to an embodiment of the invention, the method further comprising the steps and/or features of one or more of the claims.

THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
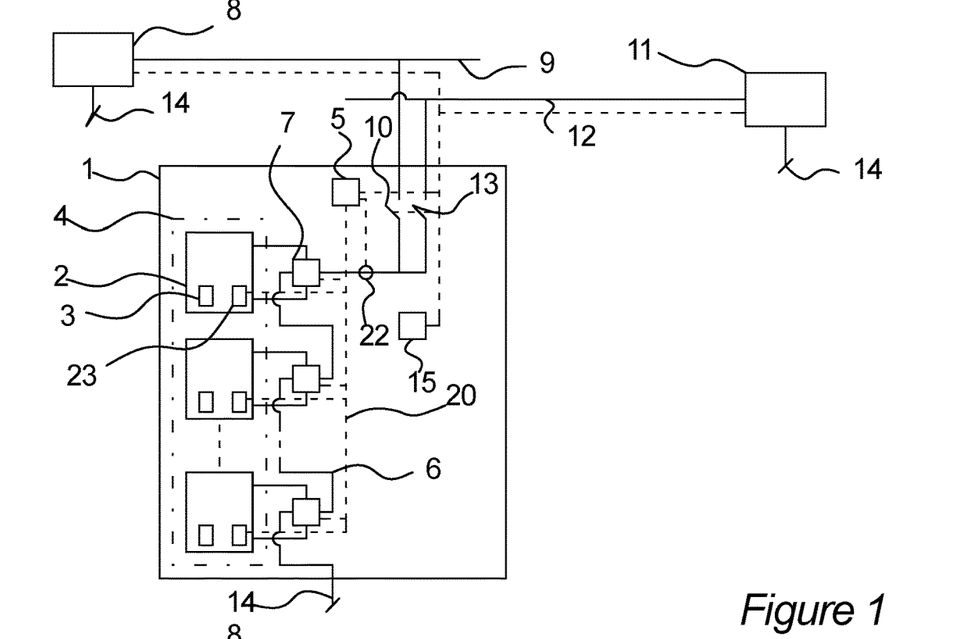
FIG. 1 illustrates an energy storage connected to a first and a second electric bus.

FIG. 1 illustrates an energy storage 1 comprising only one energy module string 4. The energy module string 4 comprises a plurality of energy modules 2 each comprising one or more energy storage elements including battery elements 3 or capacitors. The individual energy modules 2 are connected in series via switching arrangements 7 and thereby forming the energy module string 4. The switches of the switching arrangement are preferably semiconductor switches which may be mounted on a printed circuit board 19 for selectively controlling if a current path 6 should include or exclude (i.e. bypass) the individual energy modules 2.

The switches of the switching arrangement 7 (in this document also referred to as switches 7) are controlled by a string controller 5. The string controller 5 may communicate with a current sensor 22 measuring current through the energy module string 4 (communication paths are illustrated by stipulated lines). Further, the string controller 5 may communicated with an energy module voltage sensor 23 of each of the energy modules 2. Based on measurements from the voltage sensors 23, the string controller 5 can calculate or receive the state of charge of the energy module 2 and hence state of charge of the individual energy modules 2 can be established. Hence based on input from current sensor 22 and voltage sensor 23, the string controller 5 is able to charge individual energy modules 2 or determine a voltage which is delivered to a load. This control is made by controlling the switches 7.

It should be mentioned, that the energy module 2 could also comprise energy producing elements such as photovoltaic modules or fuel cell modules, however in a preferred embodiment the energy modules 2 comprises battery elements 3 and/or capacitor elements.

The energy storage 1 furthermore comprises an energy storage controller 15. The energy storage controller 15 may communicate with the string controller 5 and electric systems 8, 11 of the electric busses 9, 12 connected to the energy storage.

From the electric systems 8, 11 the energy storage controller 15 receives power status i.e. information of frequency, voltage, current, power factor, voltage/frequency drop, power availability (is power present, how much power is available, how much power is needed,), power forecast, harmonics transient overvoltage, etc. Alternatively, the energy storage controller 15 may communicate with sensors dedicated to measure electric values relevant for controlling the switches in or in relation to the energy module. Hence, based on the information of power status at the electric busses 9, 12/electric systems 8, 11, the energy storage controller 15 establishes reference values/control signals of e.g. current and/or voltage to the string controller 5. Based on these references and preferably also information of the voltage sensor 23 and maybe also from the current sensor 22, the string controller 5 controls the switches 7 and thereby the current path 6 through the energy module string 4.

The reference values (also referred to as control signals) are used by the string controller 5 to determine if the energy module string 4 should be discharge or charged and in both cases which of the energy modules 2 that should contribute to the delivery or needs to be charged. Further, in case the control signal is a voltage reference the string controller receives from the energy storage controller regarding the voltage required from the electric systems 8, 11, the string controller are selecting the needed number and most appropriate energy modules to deliver this voltage. Appropriate in this context may include state of charge, number of cycles, etc.

Accordingly, the control system of the energy storage system of the present invention is advantageous over prior art in that it is very simple i.e. including only a string controller for controlling and monitoring the energy modules of the string and the current path therethrough and an energy storage controller communicating with electric system outside the energy storage system and based hereon provides control signals to the string controller and controls which of the electric systems, the energy module string should be connected to.

The string controller may provide information of the status of each of the energy modules of its string and/or of the energy modules of the string as one to the energy storage controller. This information may include status of the energy modules/string such as state of charge, state of health, cycle counts, etc. This information may be used by the energy storage controller to determine which of a plurality of energy module string should be connected to which electric system. Hence, if the electric system is delivering power (e.g. a generator of a wind turbine, utility grid), one or more energy modules of a string may be charged whereas if the electric system is in need of power (e.g. a load of a wind turbine such as pitch or yaw motors or auxiliary systems), then one or more energy module of a string may be discharge.

In the situation where energy storage is connected to a wind turbine, when the windspeed is below cut in speed, the rotor may be idling and the generator generate some minor amount of energy. This energy established during idling, may be used to charge one or more energy modules of a string. In one embodiment, where the energy storage system comprises more than one energy module string, one string may be charged from a wind turbine in idling mode and a second string may supply the auxiliary system of the wind turbine. In this embodiment, the operation of the energy storage system is controlled by only the string controllers of the two stings and the energy storage controller. The string controllers provides information to the energy storage controller that charging is needed and the energy storage controller via the bus switches connects the string to the electric bus of the generator. The string controller then autonomous determine a charging sequence of the energy modules of the string. One charging strategy may be charging one energy module at the time and another may be to establish equal state of charge of all modules by individually charging and subsequently charge all energy modules simultaneously. The string controller and energy storage controller may communicated bidirectionally at discrete time intervals or continuously and based e.g. state of charge threshold values, provided to the energy storage controller by a user of the system, the energy storage controller may via the bus switches change which energy module string is connected to which electric bus. To ensure that power is available for critical loads, such change may be done by first connecting two strings to the bus of the critical load and then disconnect the string that needs to be charge before connecting that string to the charging bus.

According to an embodiment of the invention, the string controller, when receiving a control signal such as a voltage reference is establishing the output voltage of the energy module string according to one of a plurality of different strategies. The strategies are selected in dependency of considerations such as state of charge, state of health, switch loss, etc. A simple strategy is energy module voltage, a second is various approaches to pulse width modulation.

As mentioned, the output from a battery string can be established in any steps from 0V to the full string voltage. One way of establishing this is by the string controller to control the switches according based on the pulse width modulation principles. Hence, for each individual energy module of a string under the control of the string controller, the string controller is controlling the output voltage of the individual energy module i.e. the contribution of the energy module to the string voltage.

In this way, the string voltage can be any value and not only in steps of energy module voltage. Hence, if the energy modules are 50V modules and the string voltage is required to be 75V, the string controller may (based some of the abovementioned parameters of the batty modules of the string such as state of charge) select one energy module to deliver full module voltage and one energy module to deliver 50% of its battery voltage to together reach 75V. Alternatively, the string controller may perform pulse width modulation on three energy modules such that each of the three energy modules of 50V is delivering 50% module voltage i.e. together 75V.

Hence, based on the voltage reference received by the string controller from the energy storage controller, the string controller calculates on-time for a number of required energy modules and controls the switches accordingly. The string controller may autonomous determined the on-time or distribute the on-time between the energy modules of the string to avoid having one module with too small on-time, distributing wear, etc. of the energy modules.

Delivering 50% of energy module voltage should be understood as connecting the energy module to the string 50% of the time by means of pulse width modulation.

This increase of quality of string voltage (not only shaped by full module voltage) comes with the price of increased switching losses which is an argument not to perform the pulse width modulation or reduce the use of pulse width modulation based control.

Further from FIG. 1 it is illustrated, that the energy module string 4 can be selectively connected to either the first or the second electric bus 9, 12. In theory, it is possible to connect both busses 9, 12 to the energy module string simultaneously. It should be mentioned, that a plurality of electric busses can be connected to the energy storage even though only two are illustrated in the figures. The connection of electric busses to the energy storage 1 is controlled by the energy storage controller 15. Based on the information received and described above, the energy storage controller 15 selectively controls bus switches 10, 13 and thereby which of the electric busses that is to be connected to the energy module string 4.

Following a connection of e.g. the first electric bus 9 to the energy storage 1, the electric system 8 of the first electric bus 9 is also connected to the energy storage 1 (meaning to an energy module string of the energy storage). Even only one electric system 8 is illustrated on the figures as connected to the electric busses 9, 12, it should be understood, that several electric systems can be connected to the energy storage 1 via the first and/or second electric buses 9, 12.

A source electric system could be a generator of a wind turbine, the utility grid, a photovoltaic system, etc. hence any system that is able to charge energy modules 2 of the energy storage. A load electric system could be an auxiliary system or electrical components of a wind turbine, a motor, a pump, etc. It should be mentioned that the utility grid may in one situation act as a source an in another situation act as a load seen from the energy storage module.

According to an embodiment of the invention, the system illustrated on FIG. 1 could be an electric system 8 in the form of a wind turbine generator capable of charging the energy modules 2 of the energy storage 1 when the first bus switch 10 is closed i.e. in ON position (and the bus switch 13 is in OFF position i.e. open). The electric system 11 of the second bus 12 may in this embodiment be the auxiliary system of the wind turbine which is supplied from the energy storage 1 when the second bus switch 13 is closed i.e. in its ON position (and the bus switch 10 is in OFF position). Hence, when the string controller 5 identifies one or more energy modules 2 which needs to be charged (having a state of charge below a given threshold), the string controller 5 communicates to the energy storage controller 15 to allow charging i.e. closing the first bus switch 10 (and opening the second bus switch 13). Similarly, when the power status of the auxiliary system (electric system 11 of the second bus 12) is so that the auxiliary system needs power from the energy storage 1, the energy storage controller 15 closes the second bus switch 13 and provides a current/voltage reference to the string controller of the needed voltage/current. The string controller 5 then controls the switches 7 to comply with the received reference values. It should be mentioned, that in case the energy storage is fully charged, the switches may be kept open or alternatively kept closed if the current is controlled to be zero.

It is noted, that in the embodiment where the energy storage 1 only comprise one energy module string 4, when the first bus switch 10 is closed, the second bus switch 13 is opened and vice versa. This is at least true when voltage and/or current (including frequency) of the two electric busses 9, 12 are not the same. An example of when it is not advised to have both bus switches 10, 13 closed on the same time is if the wind turbine generator delivers an AC current and the auxiliary system requires a DC current.

Figure 2:
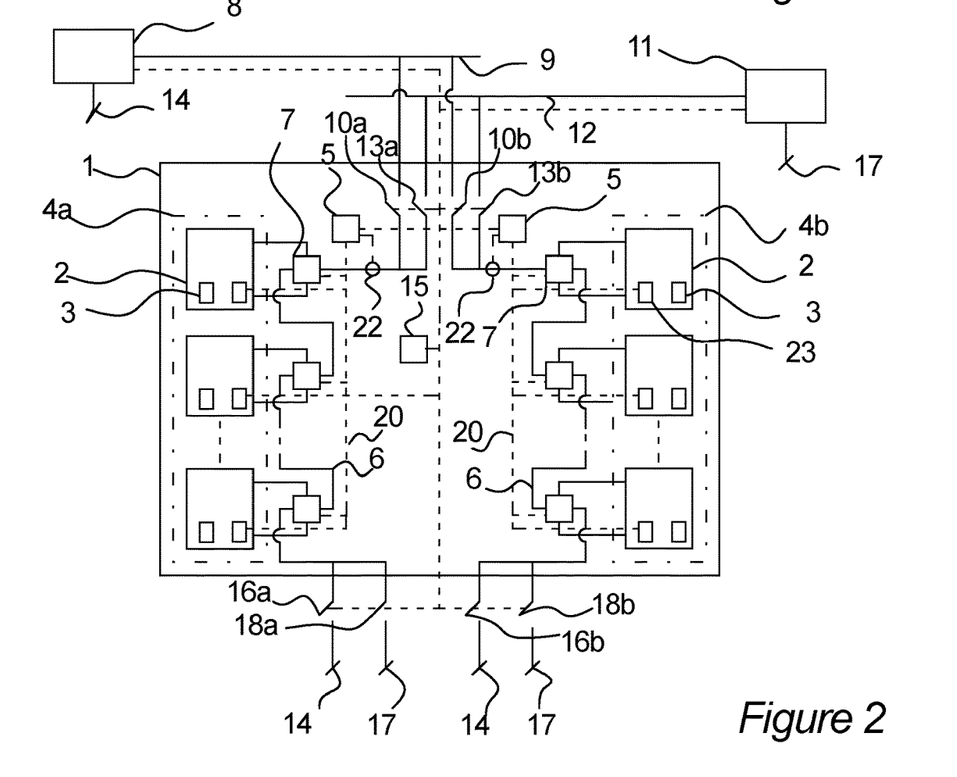
FIG. 2 illustrates an energy storage connectable to a first and a second reference potential.

An embodiment of the invention where the energy storage 1 comprises two energy module strings 4a, 4b is illustrated on FIG. 2. The energy module strings 4a, 4b illustrated on FIG. 2 may be identical and identical to the energy module string 4 illustrated on FIG. 1. With this said, the individual energy modules 2 may comprise different battery element both in terms of type, size and number. Further, it should be mentioned, that the energy module strings may also comprise different numbers of energy modules.

As illustrated on FIG. 2, the energy storage controller 15 in contrary to the embodiment illustrated on FIG. 1, here also controls first reference potential switches 16a, 16b and second reference potential switches 18a, 18b. When e.g. the first reference potential switch 16a is closed, the first energy module string 4a is connected to a first reference potential 14. In the same way, if e.g. the second reference potential switch 18b is closed, the second energy module string 4b is connected to a second reference potential 17. Further it is illustrated, that the first electric system 8 is connected to the first reference potential 14 and the second electric system 11 is connection to the second reference potential 17.

Accordingly, by coordinated control of the first and second bus switches 10, 13 and the first and second reference potential switches 16, 18, it is possible to connect a first electric bus 9 having a first reference potential 14 to a energy module string 4a being connected to the first reference potential 14. Simultaneously, it is possible to connect a second electric bus 12 having a second reference potential 17 to a energy module string 4b being connected to the second reference potential 17.

This enables a transformer-less galvanic isolation between the electric system 8 of the first electric bus 9 and the electric systems 11 of the second electric bus 12. Further, it enables inputting/charging with AC or DC to one energy module string 4a and outputting/discharging from the second energy module string 4b. It should be mentioned that the DC and AC mode is also true for the discharging. The charging and discharging of the energy module 2 is controlled by the string controllers 5 and the source/load to which the strings 4 are connected is controlled by the energy storage controller 15. When the first energy module string 4a is sufficiently charged, preferably fully charged or the second energy module string 4b is discharged to a defined threshold, the energy storage controller 15 facilitates a change. The change is so that the second energy module string 4b then is connected to and charged from the first electric bus 9 and the first energy module string 4a is connected to and discharged by the second electric bus 12.

This change between which busses 9, 12 that is connected to which strings 4 includes not only changing status (open/close) of the bus switches 10, 13, but since the busses 9, 12, has different reference potentials 14, 17, it also includes changing status of the reference potential switches 16, 18. In an embodiment, the current in the current paths 6 through the energy module strings 4a, 4b and/or the voltage over the energy module strings 4a, 4b is controlled to a level which preferably is 0 or close to 0 before switching the bus switches 10, 13 by the string controller 5.

The change between electric busses can be made according to different strategies. One situation is that the second electric bus 12 is the load carrying bus and the electric system 11 connected hereto has to be connected to an energy module string 4 all the time. The strategy for this change could be to connect both the first and second energy module strings 4a, 4b to the second electric bus 12 and to the same reference potential 17, the reference potential of the second electric bus 12. Then subsequently, connect the second energy module string 4b to the first electric bus 9 and to the reference potential 14, the reference potential of the first electric bus 9. As mentioned above, the change of electric bus 9, 12 and reference potential 14, 17 is preferably controlled from the energy storage controller 15 via the bus switches 10, 13 and reference potential switches 16, 18.

Other transition strategies can be applied in dependency of the importance of always being able to supply power. Hence, simultaneous switching (changing) between busses and reference potential may be made according to an embodiment of the invention.

Simultaneous switching is needed if interruption of both source power and load power is not allowed. E.g. a photo voltaic system where continuous power flow from source to load is needed. For simultaneous switching, the current need not to be controlled to be zero before switching, hence the switching must be done as fast as possible with preferably no/limited deadtime. To facilitate this, IGBTs or other semiconductor types would be preferred for the bus switches. Further, it is also preferred, in this situation, to include a snubber circuit around the bus switches to absorb/release energy while the switching transition occurs.

In an embodiment, it is preferred to control the current to zero and make a "slow" switching in that it reduces the stress on the switching device, meaning that the reliability/lifetime of the switch increases. Also, by only needing "slow" switching, it is possible to use cheaper and more robust devices like contactors and relays instead of transistors.

Another example of switching between busses occurs when the load on the second bus may be supplied from a source on the same bus, so there is no need for supplying power from the energy module strings to that bus. Therefore, both energy module strings are connected to the first bus to be charged by a source on that bus. Then, when the source on the second bus cannot supply enough power to the load, one of the energy module strings can switch to the second bus to supply power to the load.

Alternatively, if a power source of the first bus must be kept running without interruption, and a load on the second bus is only turned on from time to time. Then it could be an "island" where the load is very fluctuating and a renewable energy source, e.g. a wind turbine may be used to supply the power instead of starting up a diesel generator every time the load appears.

Figure 3:
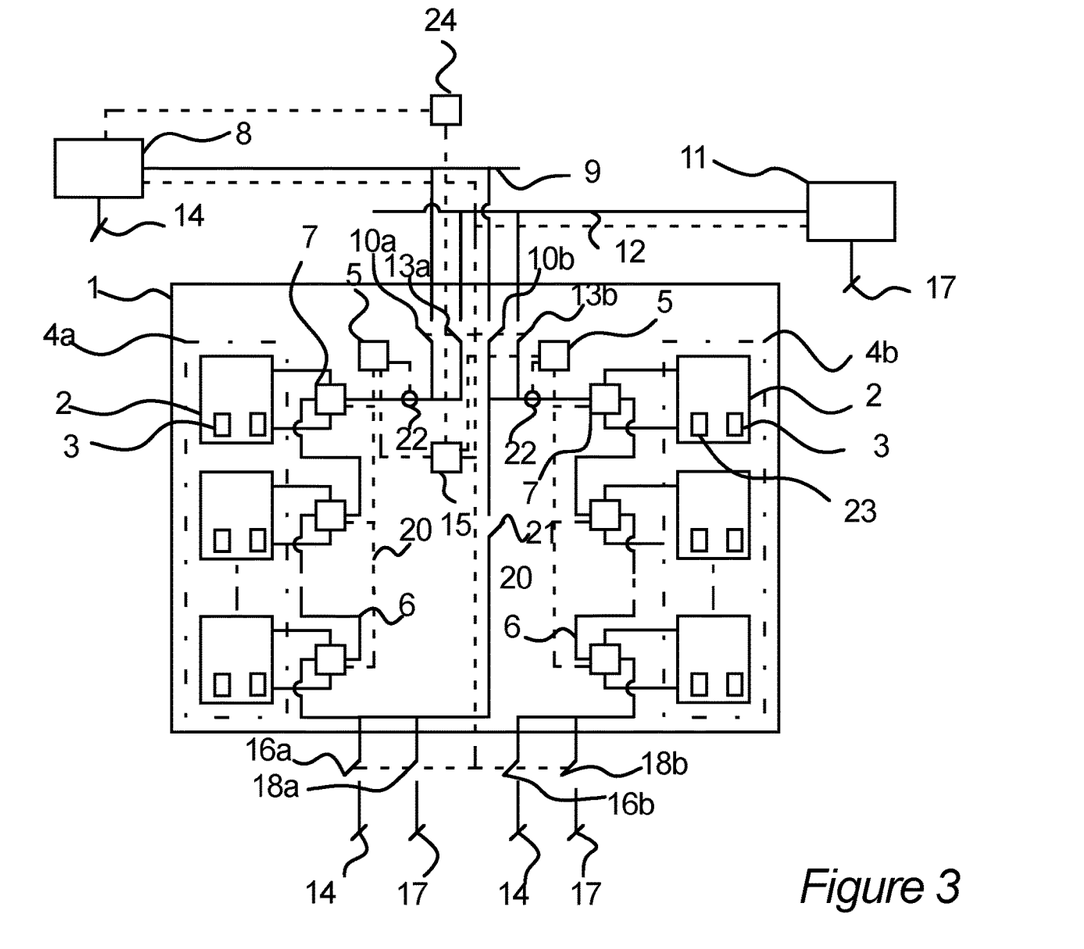
FIG. 3 illustrates the energy storage of FIG. 2 in which energy module strings are connectable.

FIG. 3 illustrates yet another embodiment of the energy storage 1 described with reference to FIGS. 1 and 2. FIG. 3 illustrates an external controller 24 which could be the controller of a load or source electric system 8 or 11 such as a wind turbine, utility grid, photo voltaic system, etc. The external controller may together with other not illustrated external controllers communicate with the energy storage controller 15.

Further, the energy module strings 4a and 4b may be connected via the string switch 21 controlled by the energy storage controller 15. In this way two strings can be connected in series if necessary. This is advantageous in that the series connected strings can be connected to a bus facilitating a higher peak voltage than each individual string can handle.

From the above, it is clear that the described energy storage 1 is very flexible especially the embodiments illustrated on FIGS. 2 and 3. Hence, it can be controlled to convert or transfer energy from one power bus to another and to be connected to two power busses simultaneously independent of reference potential of these busses or electric systems connected hereto.

Even though the figures only illustrates one or two energy module strings 4, it should be mentioned that this number can be increased as required. Hence, if the busses 9, 12 are three phased busses, the energy storage 1 may comprise one or more energy module strings 4 for each of the phases.

Figures 4, 5:
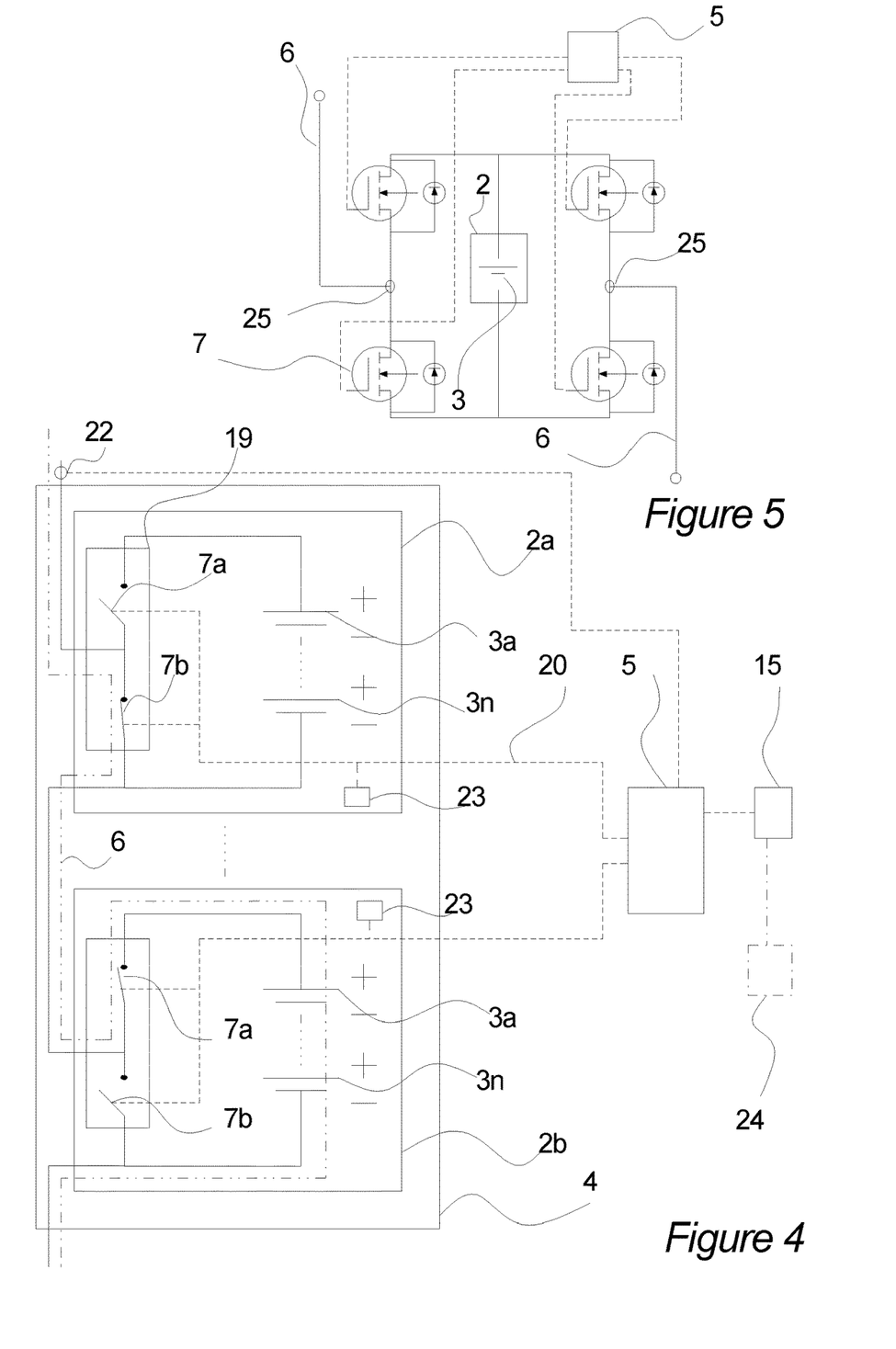
FIG. 4 illustrates an energy module of an energy storage.
FIG. 5 illustrates switches controlling the current path through the energy storage.

FIG. 4 illustrates the principles of the design of an energy storage 1 including a minimum of elements according to an embodiment of the invention. The energy storage 1 is built of a plurality of energy modules 2. Each of the energy modules 2 are controlled by at least two semiconductor switches 7 and includes at least one battery and/or capacitor element 3. The status of the semiconductor switches 7 is controlled by a string controller 5 and thereby, the string controller 5 is controlling a current path 6 through selected energy modules 2 of the energy storage 1.

It should be noted, that even only two switches 7 are illustrated on FIG. 4, in a preferred embodiment, four switches are used to control the current path 6 through or bypassing the energy modules 2. This preferred embodiment of using four switches is described with reference to FIG. 5.

The way of the current path 6 through the energy storage 1 is determined by the status of the semiconductor switches 7 and is therefore controlled by the controller 5. The status of the semiconductor switches 7 is determined based on availability of energy modules/elements 2, 3, health status of the energy modules/elements 2, 3, state of charge of the energy modules/elements 2, 3, charging voltage available, desired/required voltage across/from the energy storage 1, health/wear of switches, requirements from the electric busses 9, 12, or electric systems 8, 11 hereof, etc. The status of a semiconductor switch 7 is changed between a conducting mode (switch closed, ON) and a non-conducting mode (switch open, OFF). A deadtime between change from one status of the switch to another status is preferably adjustable between 10 nanoseconds and 1 microsecond, typically the value is a couple of 100 nanoseconds.

A energy module 2 may not be available if e.g. a battery element 3 hereof is defect. The health status of an energy storage element 3 may refer to the number of times the particular energy storage element 3 has been charged/discharge. The higher number, the closer to end of life time of the energy storage element 3 hence, the controller 5 may keep track of this number and activate energy modules 2 trying to keep this number more or less the same for all energy storage elements 3 of the energy storage 1. In the same way, health of switches 7 can also be estimated based on the number of times it has been switched. Further, there are other options of health monitoring of batteries including estimate the remaining capacity of the energy module. When the capacity is below a defined threshold, e.g. 70% of initial value, then replacement of the battery should be considered and estimate the series resistance of the battery. When the resistance is above a defined threshold, e.g. 200% of initial value, then replacement of the battery should be considered.

One of the most important parameter for determining status of the switches 7 (beside external input) is as described the voltage over the energy storage 1. This voltage can be measured or the controller 5 can calculate it based on knowledge of the number of energy storage elements 3/energy modules 2 that is part of the current path 6. Each of the energy modules 2 may comprise a battery monitoring system/sensor 23 that communicates with the string controller 5. Further, in at least one location of the current path 6 (illustrated by divided line) a current sensor 22 is located which communicates with the controller 5.

The energy storage 1 illustrated in FIG. 4 comprises a first energy module 2a and a second energy module 2b each including a plurality of battery elements 3a, . . . , 3n. The battery elements 3a-3n of the first energy module 2a are bypassed because of the non-conducting status of switch 7a and the conducting status of switch 7b. The battery elements 3a-3n of the second energy modules 2b is included in the current path 6 because of the conducting status of switch 7a and the non-conducting mode of switch 7b.

The status of the switches 7 is as mentioned controlled by the string controller 5 communicating with the switches 7 via a control signal path 20. The string controller 5 is preferably also connected to an energy storage controller 15 and/or an external controller. The latter (not illustrated) may be implemented as a wind turbine controller or wind park controller. Further, as illustrated the string controller 5 preferably also receives input from a current sensor 22 which is implemented in the current path 6.

The current path 6 is preferably galvanic separated from the control signal path 20 in order not to disturb the control signals controlling the status of the switches 7. The galvanic separation can be made at the string controller 5, at the energy storage 1, at the energy module 2 or at the printed circuit board 19 (if any) on which the switches 7 are mounted. The galvanic separation can be established by optic data communication, optoelectrical data communication, by means of a transformer. It should be mentioned, that FIG. 4 illustrates an example of series connected energy module 2 which would be referred to as an energy module string 4. An energy storage 1 may comprise several energy module strings 4. In this case preferably each string 4 has its own string controller 5 and it would be possible to connected the strings 4 in series or on parallel. The overall control of the energy storage 1 would in this case be made by the energy storage controller 15 in combination with the string controller 5. As mentioned, an external controller 24 provide input to the control of the energy storage controller e.g. in the form of current and voltage setpoints.

The number of energy modules 2 of an energy storage 1 may vary between 1 and 25 or even more, typically the energy modules 2 are series connected in columns in the energy storage 1 where each column typically comprises between 5 and 20 energy modules 2. The number of energy modules 2 and thereby battery elements 3 used in the current path 6 is determined by the desired voltage over the energy storage 1 which is in an embodiment higher than the peak voltage of the first and/or second busses 9, 12. The storage capacity of the energy storage 1 is determined by the application in which the energy storage 1 is used i.e. by the requirements of the electric systems 8, 12 of the first/second busses 9, 12 to which the energy storage 1 is connected. Further, the number of battery elements 3 of the energy modules 2 may vary like the energy modules 2 does not have to be identical within the energy storage 1 and even not within the strings 4. Just as long as the string controller 5/energy storage controller 15 is updated with information of what is behind the individual switches 7.

Preferably, the switches 7 are semiconductor switches of the IGBT (IGBT; Insulated Gate Bipolar Transistor), MOSFET (MOSFET; Metal-Oxide-Semiconductor Field-Effect Transistor) type, GaN transistors (Gan; Gallium Nitride) or SiC transistors (SiC; Silicon Carbide), however other types of switches can also be used.

Preferably, commodity switches 7 are chosen in that they are well tested and low in price. The commodity switches are typically not designed for operation in high voltage (e.g. above 1000V) and with high currents (e.g. above 500 A) so the number of this type of switches is higher compared to designs using switches designed for higher voltage and currents. However, the increased number is compensated by the lower price of the commodity switches. A preferred type of switch 7 for use in the present invention is designed to currents up to 100 A and voltages up to 50V, preferably the switches 7 are mounted on printed circuit board 19. At higher voltages of the preferred types of switches, the on-resistance of the semiconductor switch 7 is increasing and thereby the power loss in the switch 7.

Preferably, a reference to energy storage element 3, is a reference to a plurality of battery elements connected in series in an energy module 2. With this said, it could be a mix of battery elements and capacitor elements or other types of energy storage elements. The number of energy storage elements may vary, between 2 and 25 or even more in one column of series connected energy storage elements 3. A typical column comprises between 10 and 20 series connected energy storage elements 3 of one or more modules 2. The number of energy storage elements 3 in a column depends on requirements of the energy storage 1 and a compromise must be found between few energy storage elements 3 leads to low price and reduced power loss while many energy storage 3 reduces the harmonic current contribution and leads to a more reliable system in that the redundancy/flexibility in control is increased.

The battery storage elements 3 are preferably of the li-ion type since the characteristics of this battery type complies with the requirements of the energy storage 1 and the environment of e.g. a wind turbine. With this said, other battery types may also be used. As an example, one battery element 3, may be a 3.2V element which when connected with e.g. 14 similar elements 3 leads to a 48V battery pack within one energy module 2. Hence in this example, the energy module 2 comprise one 48V battery pack which can be controlled by the switches 7. The capacity of the individual battery elements 3 is preferably between 10 Ah and 200 Ah or even higher, but as mentioned this is a design choice based on requirements to the energy storage 1 and prices of the system. Especially in the preferred embodiment where the switches 7 are mounted on a PCB 19, the maximum current is determined as the lower of the maximum current allowed through the current path of the PCB 19 and the maximum battery current. In case the semiconductors 7 are not mounted on the PCB 19 the current limiting factor is also the current limit of the switch or battery. In practice it is often the battery which will be the limiting factor, because it is harder to find a 500 A battery compared to finding a 500 A power module.

An electric diagram of the configuration of the four switches 7 according to a preferred embodiment of the invention is illustrated on FIG. 5. The diode illustrated is the diode of a MOSFET semiconductor switch 7 used in an embodiment of the invention. The energy module 2 illustrated on FIG. 5 includes four semiconductor switches 7 because it has to comply with AC current and voltage i.e. both negative and positive polarity of the busses 9, 12 to which the energy module string 4 is connected and still be able to be bypassed as described above. FIG. 5 only illustrates one energy storage element 3, however as understood from the above description, there may be several battery elements 3.

As can be understood from the above, the invention relates to an energy storage comprising a plurality of selectively controllable energy storage modules 2 arranged in one or more strings 4. The energy storage may comprise bus switches 10, 13 via which the one or more strings 4 can be connected to one or more busses 9, 12. Further, the energy storage 1 may comprise reference potential switches 16, 18 via which the one or more strings 4 can be connected to one or more reference potentials 14, 17. The choice of reference potential is determined to match the reference potential of the electric system 8, 11/busses 9, 12 to which the string 4 is connected. The status of the switches 7, 10, 13, 16, 18 is controlled by the string controller 5 or energy storage controller 15.

Hence, from the above it can be understood, that the present invention is advantageous in that one string 4 can be charged from one of the busses and discharged to the other bus. In fact, such charging/discharging can be done simultaneously and independent of reference potential of the two electric power busses. Further, although the energy storage in some aspects can be seen as a converter, the present invention eliminates the need for having a separate/dedicated converter for each bus or transformers to match the voltages of the electric busses. Further, the present invention constitutes a transformer-less galvanic isolated power transfer between two galvanic isolated power systems/electric busses.

The energy storage 1 may be used in photovoltage systems, wind turbine systems, conversion systems, as uninterruptible power supply, etc.

LIST

1. Energy storage
2. Energy module
3. Energy storage element
4. Energy module string
5. String controller
6. Current path
7. Switching arrangement
8. First electric system
9. First electric bus
10. First bus switch
11. Second electric system
12. Second electric bus
13. Second bus switch
14. First reference potential
15. Energy storage controller
16. First reference potential switch
17. Second reference potential
18. Second reference potential switch
19. Printed Circuit Board
20. Control signal path
21. String switch
22. Current sensor
23. Energy module voltage sensor
24. External controller
25. Midpoint of H-bridge

The invention claimed is:

1. An energy storage comprising a plurality of energy modules electrically connected to a switching arrangement, at least part of the plurality of the energy modules comprises a plurality of battery elements and are electrically connected via the switching arrangement and thereby configured to establish an energy module string,
   wherein the switching arrangement comprise four switches in a H-bridge configuration and thereby configured to control if a current path though the energy module string is bypassing or passing through the energy module associated with the switching arrangement,
   wherein a string controller is configured for controlling the status of the four switches and thereby the current path and associated string voltage through the energy module string,
   wherein a first end of the current path is electrically connectable to a first electric system of a first electric bus via a first bus switch and to a second electric system of a second electric bus via a second bus switch,
   wherein a second end of the current path is electrically connectable to a first reference potential, the first reference potential being the same as the reference potential of the electric system connected to the first end of the current path,
   wherein an energy storage controller is configured for receiving power status from the first electric system and from the second electric system,
   wherein the energy storage controller is configured for controlling the status of the first bus switch and of the second bus switch and to provide a control signal to the string controller in dependency of the received power status,
   wherein the string controller is configured to control the number of energy modules to include in the current path based on the received control signal and to control which of the energy modules to include in the current path based on the information received from the individual energy modules,
   wherein the energy storage includes at least two energy module strings comprising a first energy module string and a second energy module string,
   wherein a load is supplied from the first energy module string, and
   wherein said energy storage controller is configured to connect the second energy module string to the load before disconnecting the first energy module string from the load.

2. The energy storage according to claim 1, wherein the second end of the current path is connectable to the first reference potential via a first reference potential switch and to a second reference potential via a second reference potential switch.

3. The energy storage according to claim 1, wherein an energy module string voltage is the sum of voltages of the plurality of energy modules connected to the current path, and wherein the string controller is configured to determine which of the energy modules to include to establish the energy module string voltage.

4. The energy storage according to claim 1, wherein the string controller is configured to determine which of the energy modules to include to establish the energy module string voltage.

5. The energy storage according to claim 1, wherein the string controller is configured for controlling the partly full energy module voltage according to pulse width modulation control of the connection of at least one energy module to the current path.

6. The energy storage according to claim 1, wherein the string controller is configured to calculate the on-time of the individual energy modules shaping the string voltage to avoid battery on-time less than 10 ms.

7. The energy storage according to claim 1, wherein each of the at least two energy modules strings are connectable to the first electric bus via the first bus switch and to the second electric bus via the second bus switches, and wherein each of the at least two energy module strings are connectable to the first reference potential via the first reference potential switch and to the second reference potential via the second reference potential switches.

8. The energy storage according to claim 7, wherein the first energy module string is connected to the first electric bus simultaneously with the second energy module string is connected to the second electric bus.

9. The energy storage according to claim 1, the energy module is connected to the H-bridge midpoint.

10. The energy storage according to claim 1, wherein the switches associated with a particular energy module are mounted on a printed circuit board associated with the particular energy module,
    wherein the printed circuit board is part of a control signal path between the string controller and the switches, and
    wherein the printed circuit board is part of the current path through the energy module.

11. The energy storage according to claim 7, wherein the first energy module string is connected to the first electric bus, and simultaneously the first energy module string is connected to the first reference potential, and
    wherein the second energy module string is connected to the second electric bus, and simultaneously the second energy module string is connected to the second reference potential.

12. The energy storage according to claim 1, wherein the status of the first bus switch and of the second bus switches is at least partly controlled based on information of the state of charge of the energy modules,
    wherein the information of state of charge of the energy modules is provided to the energy storage controller from one or more string controllers.

13. The energy storage according to claim 1, wherein the current in the current path is controlled by the string controller to be less than 5 A before the energy storage controller changes status of the bus switches.

14. The energy storage according to claim 1, wherein the voltage across the switch is controlled to be zero before turning ON the switch.

15. The energy storage according to claim 1, wherein the first and second electric systems are selected from the list comprising: electric generator, photovoltaic panel, auxiliary systems of a wind turbine, utility grid.

16. The energy storage according to claim 1, wherein the first energy module string is charged from the first electric bus with AC or DC voltage and wherein the second energy module string is discharged to the second electric bus with AC or DC voltage.

17. The energy storage according to claim 1, wherein the electric system of the first electric bus and the electric system of the second electric bus are galvanic isolated.

18. The energy storage according to claim 1, wherein the energy storage comprising a string switch configured to connect the first and second energy module strings in series.

* * * * *